United States Patent

[11] 3,628,385

| [72] | Inventors | Lester M. Ross, Sr.;<br>William W. Stripling, both of Huntsville, Ala. |
|---|---|---|
| [21] | Appl. No. | 885,766 |
| [22] | Filed | Dec. 17, 1969 |
| [45] | Patented | Dec. 21, 1971 |
| [73] | Assignee | The United States of America as represented by the Secretary of the Army |

[54] SELF-COMPENSATED AZIMUTH PICKOFF DEVICE
4 Claims, 7 Drawing Figs.

[52] U.S. Cl. .................................................. 74/5.6, 356/152
[51] Int. Cl. ........................................................ G01c 19/28
[50] Field of Search ........................................... 74/5.6; 250/203, 230; 356/152

[56] References Cited
UNITED STATES PATENTS

| 2,870,671 | 1/1959 | Falconi .......................... | 356/152 |
| 2,998,746 | 9/1961 | Gievers .......................... | 356/152 |
| 3,200,510 | 8/1965 | Hunter ........................... | 74/5.6 X |
| 3,226,982 | 1/1966 | Betts .............................. | 74/5.6 |
| 3,379,889 | 4/1968 | Barnett et al. ................. | 74/5.6 X |
| 3,449,961 | 6/1969 | Samsell ......................... | 250/203 X |
| 3,499,332 | 3/1970 | Fingerett et al. .............. | 74/5.6 |

FOREIGN PATENTS

| 1,059,300 | 2/1967 | Great Britain ................ | 74/5.6 |

Primary Examiner—Manuel A. Antonakas
Attorneys—Harry M. Saragovitz, Edward J. Kelly, Herbert Berl and Aubrey J. Dunn ABSTRACT: A device for measuring a small angular displacement of the case of a spinning sphere gyro with relation to an east-west line as defined by the spinning sphere. The case is mounted on a stabilized platform. Although the device is subjected to angular displacements about the case vertical axis and about one of the case horizontal axes, it provides an electrical output proportional only to the input about the vertical axis. This is accomplished by employing a light source projecting on a mirror carried by the sphere, with two detectors arranged orthogonal to each other. Each detector includes two photosensitive elements. The outputs of the elements are so combined that horizontal axis displacement is nulled, but vertical axis displacement is not.

PATENTED DEC 21 1971　　　　　　　　3,628,385

Lester M. Ross, Sr.
William W. Stripling,
　　INVENTORS.

SELF-COMPENSATED AZIMUTH PICKOFF DEVICE

BACKGROUND OF THE INVENTION

This invention is in the field of inertial instruments, and in particular to instruments for determining a north-south line on the earth. Missile systems require extremely accurate alignment with a north reference line for aiming. Heretofore, this line has been determined both by surveying methods, and by using inertial instruments. One such inertial instrument employs a stabilized platform aligned from a free rotor gyroscope, with means for sensing the angular displacement of the case about the azimuth axis. Unfortunately, the means for sensing also senses angular case displacement about the pitch horizontal axis. The pitch displacement is the result of platform movement as a result of pitch servo loop inaccuracies. If the output of the means for sensing is used to drive the platform in azimuth, the platform is also driven in azimuth as a result of a pitch input, and the system accuracy is destroyed. The present invention solves this problem.

SUMMARY OF THE INVENTION

The invention includes a spinning sphere gyro. In order to allow measurement of the angular displacement of the sphere with respect to a platform-fixed case about the sphere, the sphere is provided with a plane mirror mounted normal to its spin axis. Illumination from a case-fixed light is directed through a beam splitter to the mirror. Reflected light from the mirror also passes through the beam splitter and is directed on the sensors. The outputs of the sensors are combined to give an output signal proportional only to relative movement of the vertical axis only of the sphere.

DESCRIPTION OF THE PREFERRED EMBODIMENT

Figure 1:
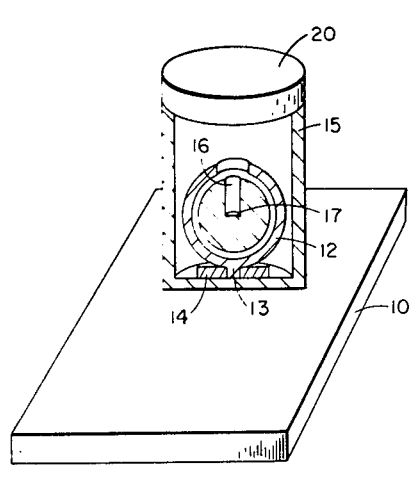
FIG. 1 is a perspective view of the mechanical arrangement of the invention, partly in section.

In FIG. 1 of the drawings, reference numeral 10 designates a stabilized platform. This platform is maintained level and aligned north-south by gyros (not shown) feeding servos (not shown) through feedback paths (also not shown). This type of platform is well known in the art and is not itself part of the instant invention. Since the platform is gyro stabilized, it hunts about its level position, depending on the accuracy of its gyro-servo links. The instant invention provides an input to that servo link which maintains the platform in azimuth (north-south) alignment. As pointed out above in the Background of the Invention, the usual azimuth servo link responds not only to azimuth movements, but to pitch movements. The gyro which provides an azimuth signal includes sphere 11 mounted within housing 12. Housing 12 includes axle 13, which axle is supported and rotated by motor 14. When operating, sphere 11 is supported by air introduced between itself and housing 12. Motor 14 is fixed to case 15. Mounted atop case 15 is enclosure 20 carrying the optics of the invention. Sphere 11 has radial hole 16 therein with flat mirror 17 at the bottom thereof.

Figure 2:
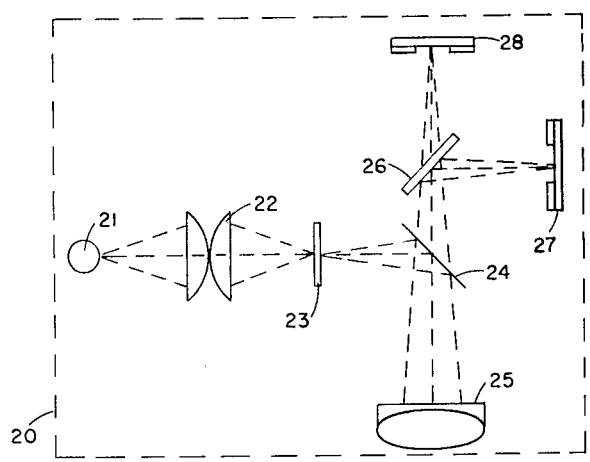
FIG. 2 is a schematic view of the optical components of the invention.

FIG. 2 shows the contents of enclosure 20. Light source 21 is provided and sends light though condensor lens 22 and source reticle 23, to beam splitter 24. The source reticle shapes the light into a square beam. Beam splitter 24 reflects the light through objective lens 25 forward mirror 17 of FIG. 1. The light is reflected by mirror 17 to the beam splitter 26, which passes part of the light to light sensor 27 and reflects part of the light onto another light sensor 28. Sensors 27 and 28 are perpendicular to the plane of the drawing.

Figure 3A:
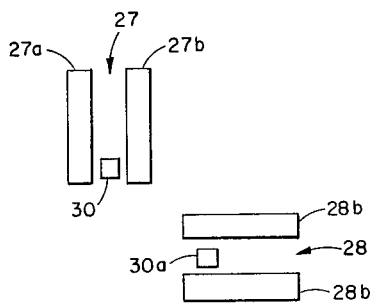
FIGS. 3a, 3b, 3c, and 3d diagrammatically show various examples of the position of the light beam with respect to the sensors.
Figure 3B:
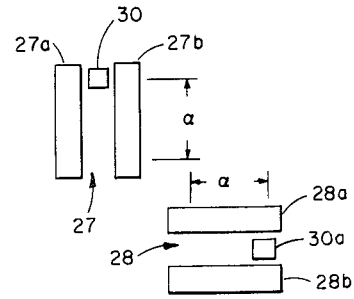
Figure 3C:
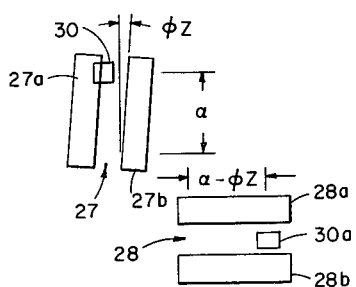
Figure 3D:
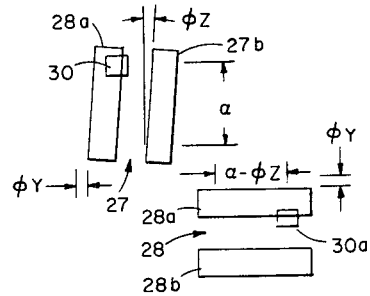

It should be understood that sensors 27 and 28 as shown in FIGS. 3a–3d are shown in a single drawing plane for ease of illustration, but are in reality in orthogonal planes. FIG. 3a shows the position of images 30 and 30a of the split light beam for initial conditions of the system. Light sensors 27 and 28 each have respective photosensitive surfaces 27a and 27b and 28a and 28b. Since the case is platform-fixed, it rotates about the yaw axis as time passes, and images 30 and 30a shift. If the yaw axis is pointing directly north, the images will move to the positions as shown in FIG. 2b. It should be made clear that viscous coupling between housing 12 and sphere 11 makes the sphere precess in such a manner that the reflection angle of the light beam on mirror 12 does not exceed a certain lag angle, regardless of time. This lag angle is represented by $\alpha$ on FIGS. 3b, 3c, and 3d. FIG. 3c shows the position of the images after $\alpha$ has reached its maximum value, and the case is rotated about the azimuth axis. Light-sensitive element 27a receives more light and gives an output indication indicative of the azimuth input, $\Phi Z$. Image 30a does not move relative to sensor 28. If the case should move about the azimuth and pitch axes simultaneously, one of surfaces of sensor 27 will receive an increased amount of light proportional to both the pitch and azimuth movements. FIG. 3d shows the position of images 30 and 30a for pitch angle change $\Phi Y$ and azimuth angle change $\Phi Z$. Surface 28a of sensor 28 receives an increased amount of light from image 30a proportional only to change $\Phi Y$ of pitch angle.

Figure 4:
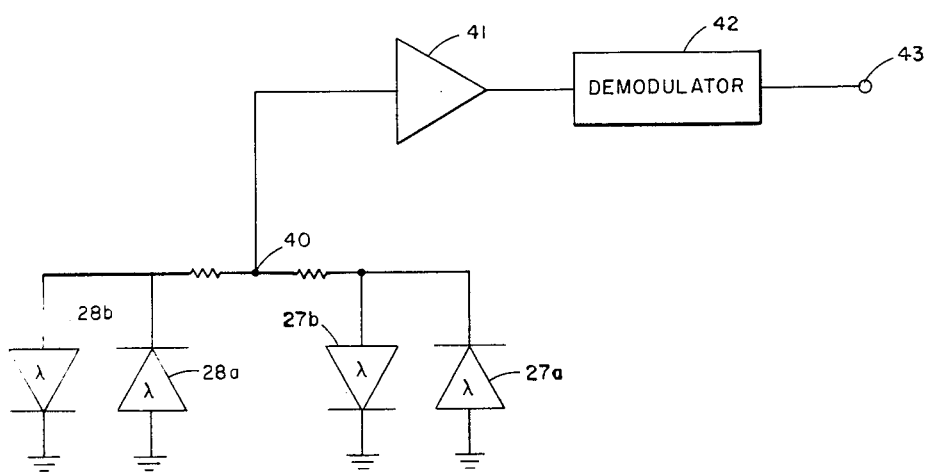
FIG. 4 shows a schematic diagram of the electronics of the invention.

As shown in FIG. 4, surfaces 27a, 27b, 28a, and 28b take the form of photodiodes connected as shown. Terminal 40 is the output terminal for the diodes. Amplifier 41 is connected to terminal 40, with the output of 41 connected to demodulator 42. The output of demodulator at the point 43 takes the form: $K_1(\sin \Phi Z + K_2 \Phi Y) - K_3 \Phi Y$, in which $K_1$, $K_2$, and $K_3$ are constants related to the sensitivity of sensors 27 and 28. If $K_1 K_2$ is equal to $K_3$, then the above equation reduces to: $K_1 \sin \Phi Z$. For small angles, $\sin \Phi Z = \Phi Z$. Output 43 may be used as the input of the platform azimuth servo loop.

Although mirror 17 has been described as plane, it could obviously take the form of a spherical section, for larger lag angles. The mirror should be deep enough within sphere 11 to insure that it has angular rather than lateral movement as the sphere rotates.

We claim:

1. A pickoff for a gyroscope having a solid spinning spherical rotor including: a plane mirror mounted within said rotor normal to the spin axis of the rotor; means for projecting a light beam on said mirror including means for imparting a square cross section to said light beam; detector means adjacent said mirror to receive reflected light from said mirror, wherein said detector means includes first and second photodetectors, each of which has parallel spaced photosensitive elements, and wherein said photodetectors are in orthogonal planes; means to divide the reflected light from said mirror between said first and second photodetectors; wherein each of said photodetectors includes two photosensitive elements, with each of said elements being a photodiode; an output terminal; a common terminal; with the anode of one of the photodiodes of each photodetector connected to said output terminal, and the cathode thereof connected to said common terminal; and with the cathode of the other photodiode of each photodetector being connected to said output terminal, and the anode thereof connected to said common terminal.

2. The pickoff as defined in claim 1 further including output means connected to said output terminal.

3. The pickoff as defined in claim 2 wherein means for projecting and said detector means are carried by a stabilized platform.

4. The pickoff as defined in claim 3 wherein said photosensitive elements are generally rectangular in shape and have parallel longitudinal axes.

* * * * *